(12) United States Patent
Galbraith et al.

(10) Patent No.: US 6,520,275 B2
(45) Date of Patent: Feb. 18, 2003

(54) MOTORCYCLE SADDLEBAG MOUNTING SYSTEM

(75) Inventors: Stephen L. Galbraith, Cedarburg, WI (US); Brian R. Sucharski, Franklin, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 09/903,432

(22) Filed: Jul. 11, 2001

(65) Prior Publication Data

US 2003/0010555 A1 Jan. 16, 2003

(51) Int. Cl.[7] .............................. B62D 61/02; B62J 9/00
(52) U.S. Cl. .................... 180/219; 280/288.4; 224/413; 224/419; 224/423; 224/447
(58) Field of Search ........................ 180/219; 280/288.4, 280/304.5, 447; 224/412–413, 419, 423, 429–431, 441, 447, 924

(56) References Cited

U.S. PATENT DOCUMENTS

| 3,227,236 | A | * | 1/1966 | Burton ........................ 224/413 |
| 3,788,532 | A | | 1/1974 | Bish |
| 3,795,354 | A | | 3/1974 | Stippich |
| 4,580,706 | A | | 4/1986 | Jackson et al. |
| 4,979,658 | A | | 12/1990 | Baker |
| 5,738,020 | A | | 4/1998 | Correia |
| 5,762,249 | A | | 6/1998 | Hann |
| 5,779,303 | A | | 7/1998 | Kuelbs et al. |
| 6,053,384 | A | | 4/2000 | Bachman |
| 6,123,329 | A | | 9/2000 | Lovitt |

OTHER PUBLICATIONS

1987–1989 1340 Parts Catalog, pp. 258–261.
1997 J & P Cycles, pp. 22–3 and 22–4.
1993 and 1994 1340 Parts Catalog, pp. 298–301.
J & P Cycles 2000 Parts and Accessories for Harley–Davidson Motorcycles, p. 719 "Saddlebag Mount Kit" p.n. 49–2542.

* cited by examiner

Primary Examiner—Avraham Lerner
Assistant Examiner—Matt Luby
(74) Attorney, Agent, or Firm—Michael Best & Friedrich LLP

(57) ABSTRACT

A saddlebag support assembly for use on a motorcycle includes a mounting member mounted to the motorcycle's shock bolt. A portion of the mounting member extends below a lower edge of the motorcycle's rear fender. The saddlebag support assembly also includes front and rear arms having front and rear plates. The front plate is mounted to the portion of the mounting member below the lower edge of the rear fender. An internal support member is mounted to the shock bolt and extends rearwardly thereof. The internal support member includes a depending portion defining a slot that receives the rear plate. The rear plate is fastened to the depending portion of the internal support member. The saddlebag support assembly further includes a bottom support for supporting the saddlebag from underneath, and a bracket having quick-release bosses. Quick-release fasteners are used to secure the saddlebag to the quick-release bosses from the inside of the saddlebag.

23 Claims, 8 Drawing Sheets

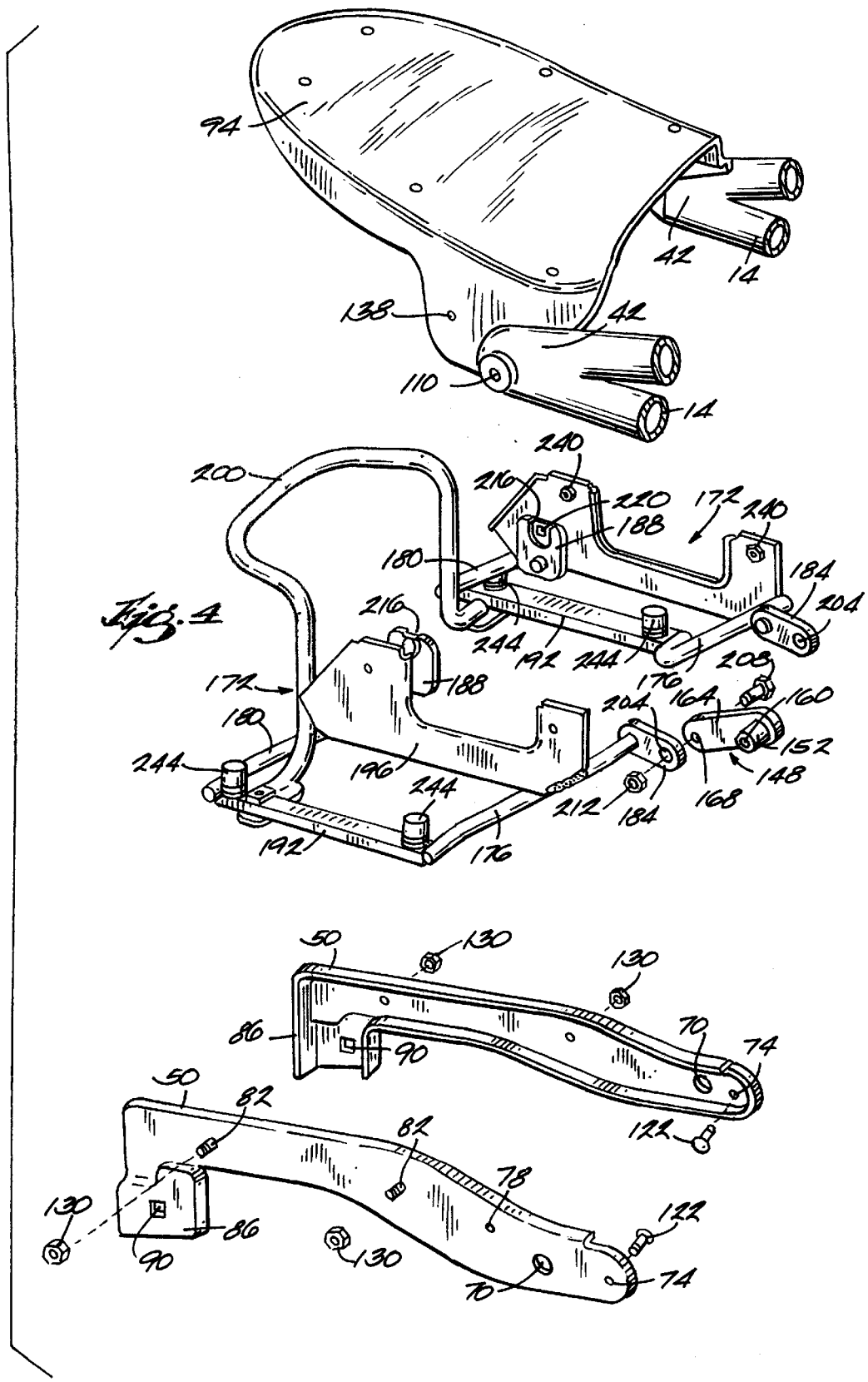

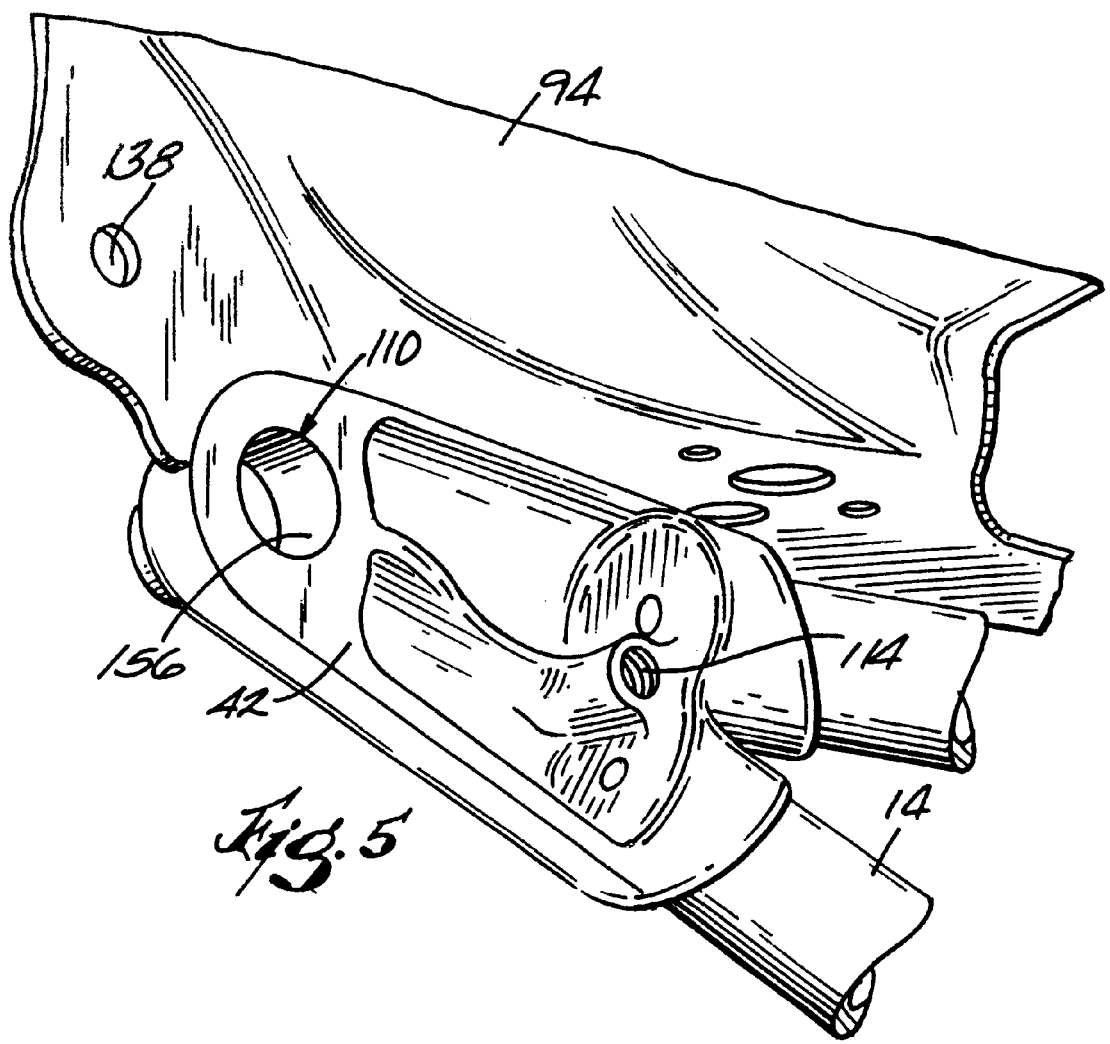

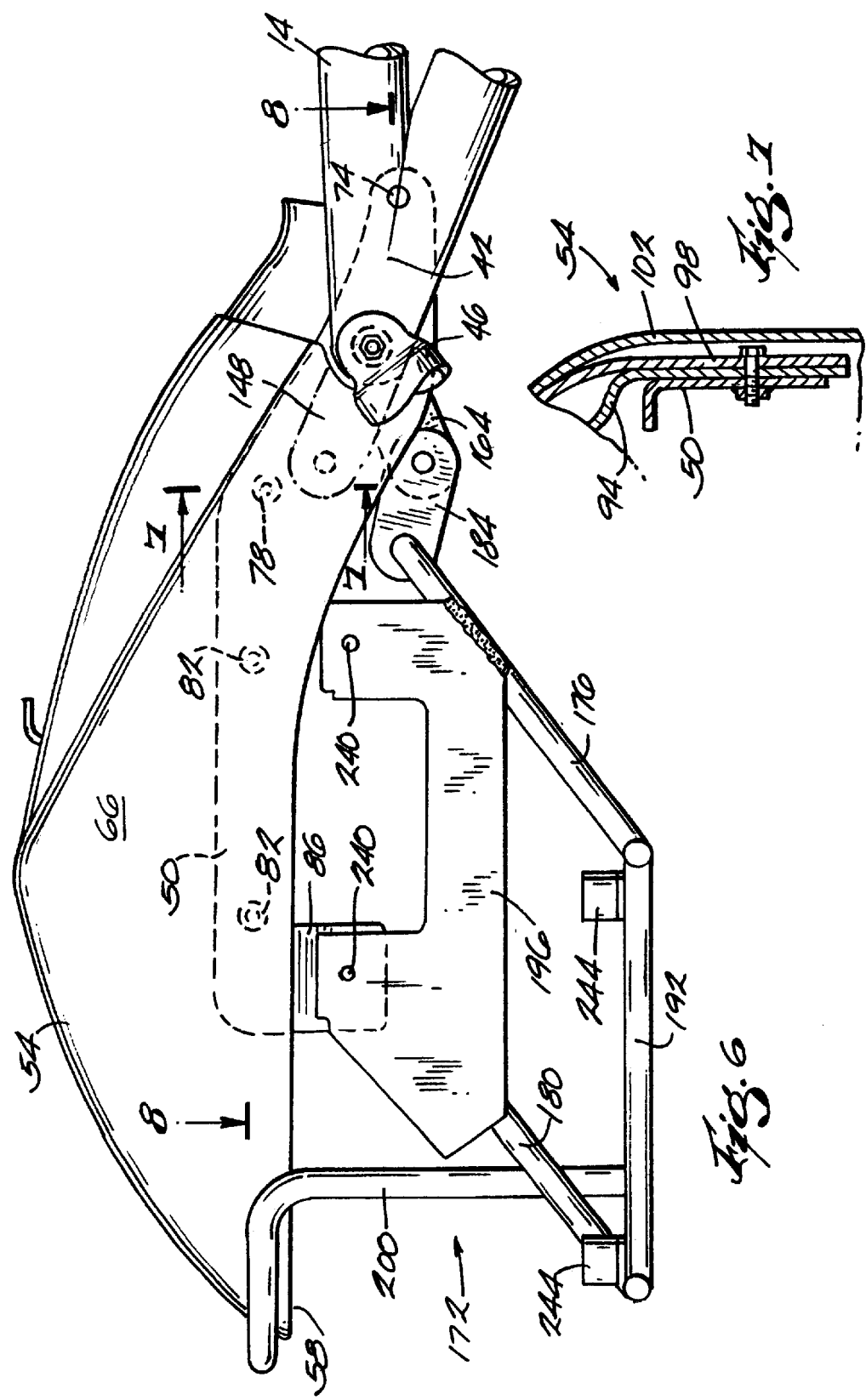

MOTORCYCLE SADDLEBAG MOUNTING SYSTEM

BACKGROUND OF THE INVENTION

The invention relates to a mounting system for a mounting a motorcycle saddlebag to the rear fender of a motorcycle.

SUMMARY

The invention provides a motorcycle having a frame that includes a shock mounting portion. A shock bolt mounts a first end of a shock to the shock mounting portion of the frame. The second, opposite end of the shock is interconnected with the rear wheel of the motorcycle. A rear fender is positioned over a portion of the rear wheel, and includes an inner surface facing the rear wheel and an outer surface facing away from the rear wheel. The rear fender also has a lower edge.

The motorcycle includes a saddlebag and a saddlebag support assembly supporting the saddlebag. A mounting member is directly mounted to the shock bolt. The mounting member extends adjacent the inner surface of the rear fender, and has a lower end extending below the lower edge of the rear fender. A fastener releasably mounts a portion of the saddlebag support assembly to the lower end of the mounting member. The mounting member preferably has an elongated collar portion defining a threaded bore into which the shock bolt is threadably received. The collar may include flats to facilitate positioning the mounting member in an operating position or a stowed position.

The motorcycle may also include an internal fender support mounted to the shock bolt and extending rearwardly of the frame along the inner surface of the rear fender. The internal fender support is directly mounted to the rear fender to support it. A second portion of the saddlebag support assembly may be directly mounted to the internal fender support. Preferably, the internal fender support includes a depending portion extending downwardly below the lower edge of the rear fender, and it is to this depending portion that the second portion of the saddlebag support assembly is directly mounted. The depending portion may define a slot that receives the second portion of the saddlebag support assembly, and a carriage bolt or other fastener preferably secures the second portion of the saddlebag assembly within the slot.

A turn signal module may be mounted to a rear end of the rear fender. The turn signal module preferably extends along the lower edge of the rear fender and covers the depending portion of the internal fender support, so that the depending portion cannot be seen during ordinary operation of the motorcycle.

The rear fender may be mounted to a seat pan portion of the frame, and preferably includes an inner fender and an outer fender. The internal fender support preferably includes threaded studs that extend through the inner fender, and onto which nuts are threaded to secure the inner fender to the internal fender support. The outer fender is positioned over the studs and nuts so that they are not visible during ordinary operation of the motorcycle.

Other features and advantages of the invention will become apparent to those skilled in the art upon review of the following detailed description, claims, and drawings.

BRIEF DESCRIPTION OF THE DRAWINGS

FIG. 4 is an exploded view of the saddlebag support assembly and rear portion of the motorcycle.

FIG. 5 is an enlarged perspective view of the shock mounting portion of the motorcycle frame.

FIG. 6 is a side view of the saddlebag support assembly mounted to the rear portion of the motorcycle.

FIG. 7 is a section view taken along line 7—7 in FIG. 6.

Figure 1:
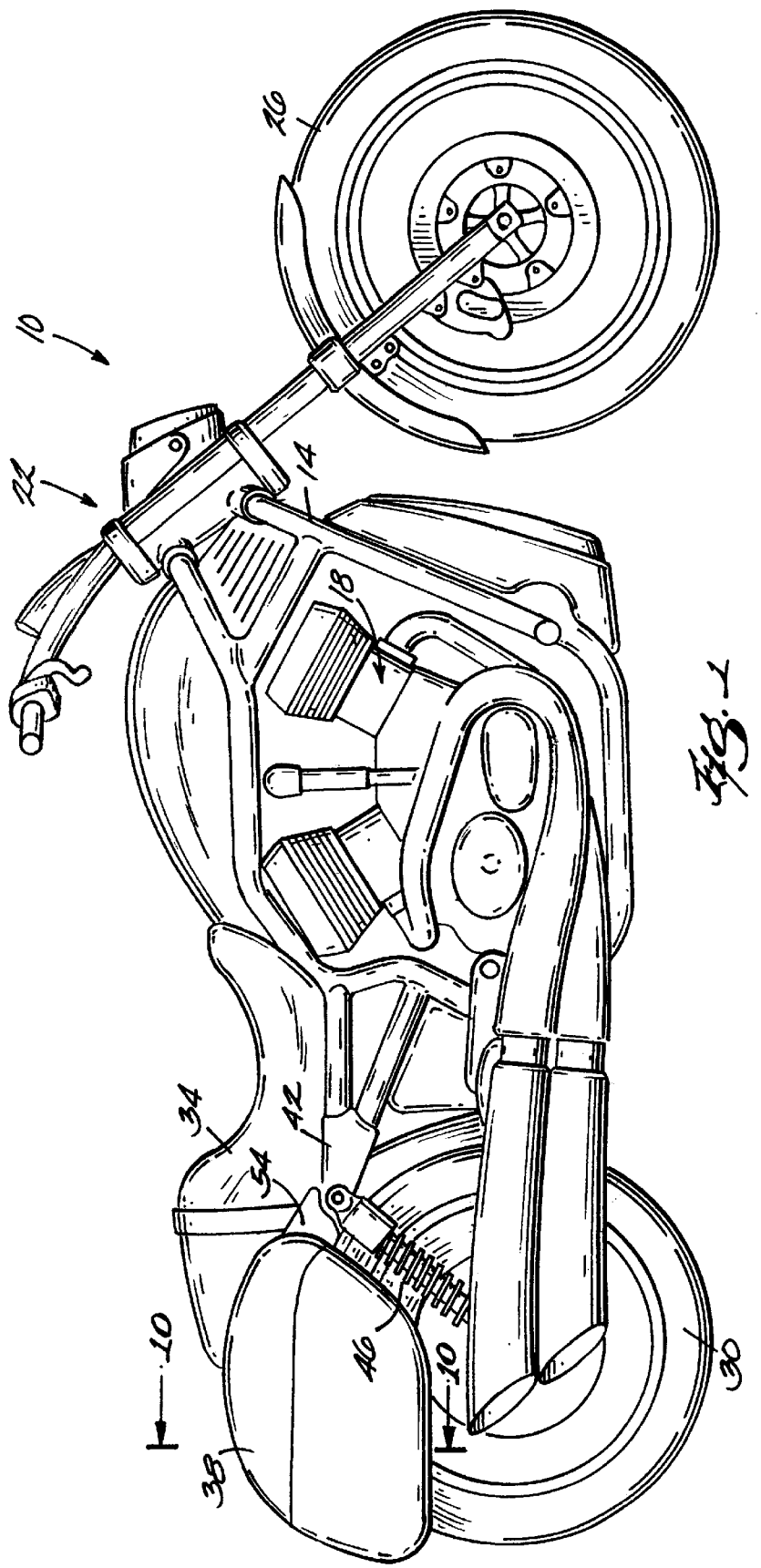
FIG. 1 is a side view of a motorcycle embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a motorcycle 10 having a frame 14, and an engine and transmission assembly 18 mounted to the frame 14. A steering assembly 22 is pivotally mounted to the frame 14. A front wheel 26 is rotatably mounted to the steering assembly 22 and supports the front of the motorcycle 10. A rear wheel 30 is rotatably interconnected with the frame 14 and supports the rear of the motorcycle 10. The rear wheel 30 is driven by operation of the engine and transmission assembly 18. The motorcycle 10 also includes a seat 34 upon which a motorcycle operator may sit while operating the motorcycle 10. A pair of saddlebags 38 (one of which is illustrated in FIG. 1 and the other of which is on the opposite side of the motorcycle - see FIG. 10) are mounted to the rear of the motorcycle 10, as will be described below in more detail.

Figure 2:
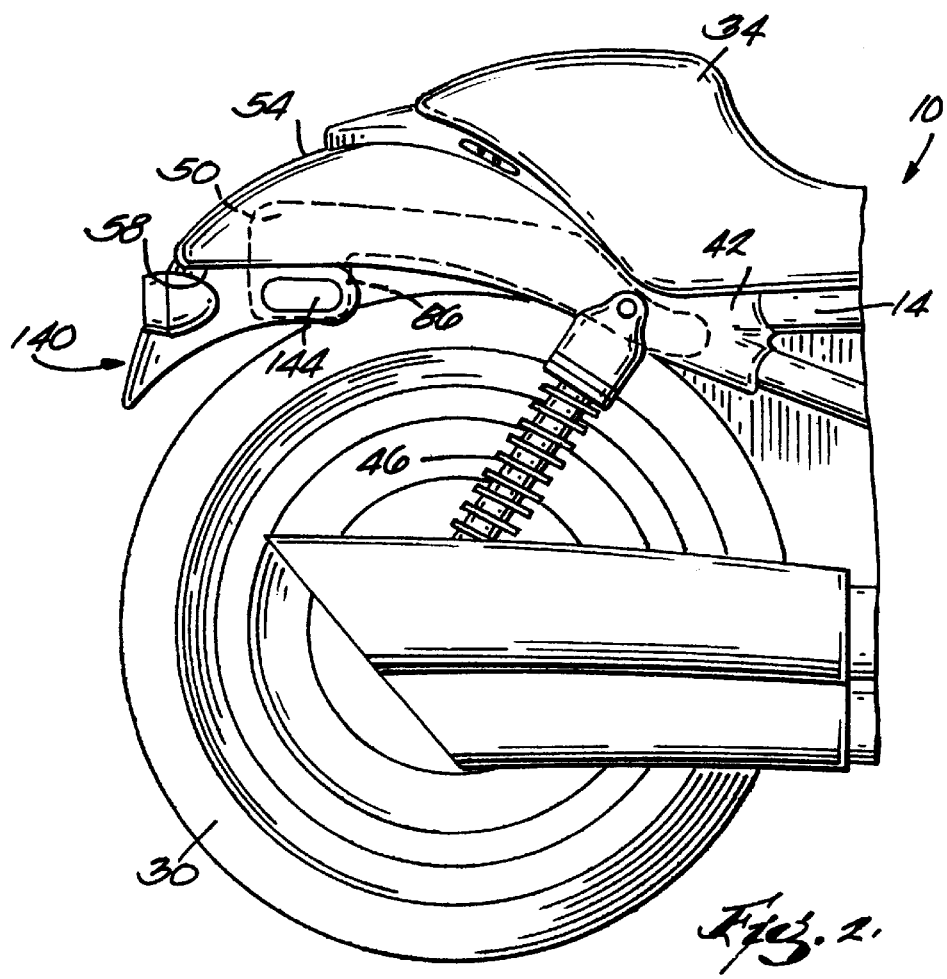
FIG. 2 is a side view of the rear portion of the motorcycle with the saddlebag and saddlebag support assembly removed.
Figure 9:
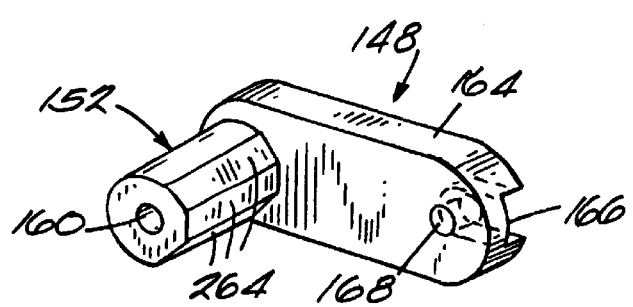
FIG. 9 is a perspective view of the mounting member portion of the saddlebag support assembly.

FIG. 2 better illustrates the rear portion of the motorcycle 10 with the saddlebags 38 removed. The frame 14 includes a shock mounting portion 42. A shock 46 has a first end mounted to the shock mounting portion 42, and a second end coupled to the rear wheel 30. The second end is coupled to the rear wheel 30 either by direct mounting to the rear wheel axle, or by being mounted to a swing arm interconnecting the rear wheel 30 to the frame 14. Left and right internal supports 50 are mounted to the shock mounting portion 42 of the frame 14 and extend rearwardly. A rear fender 54 is mounted to the internal supports 50, as will be described in more detail below. The rear fender 54 includes a lower edge 58, an inner surface 62 (FIGS. 8 and 10) generally facing toward the rear wheel 30, and an outer surface 66 facing away from the rear wheel 30.

Figure 3:
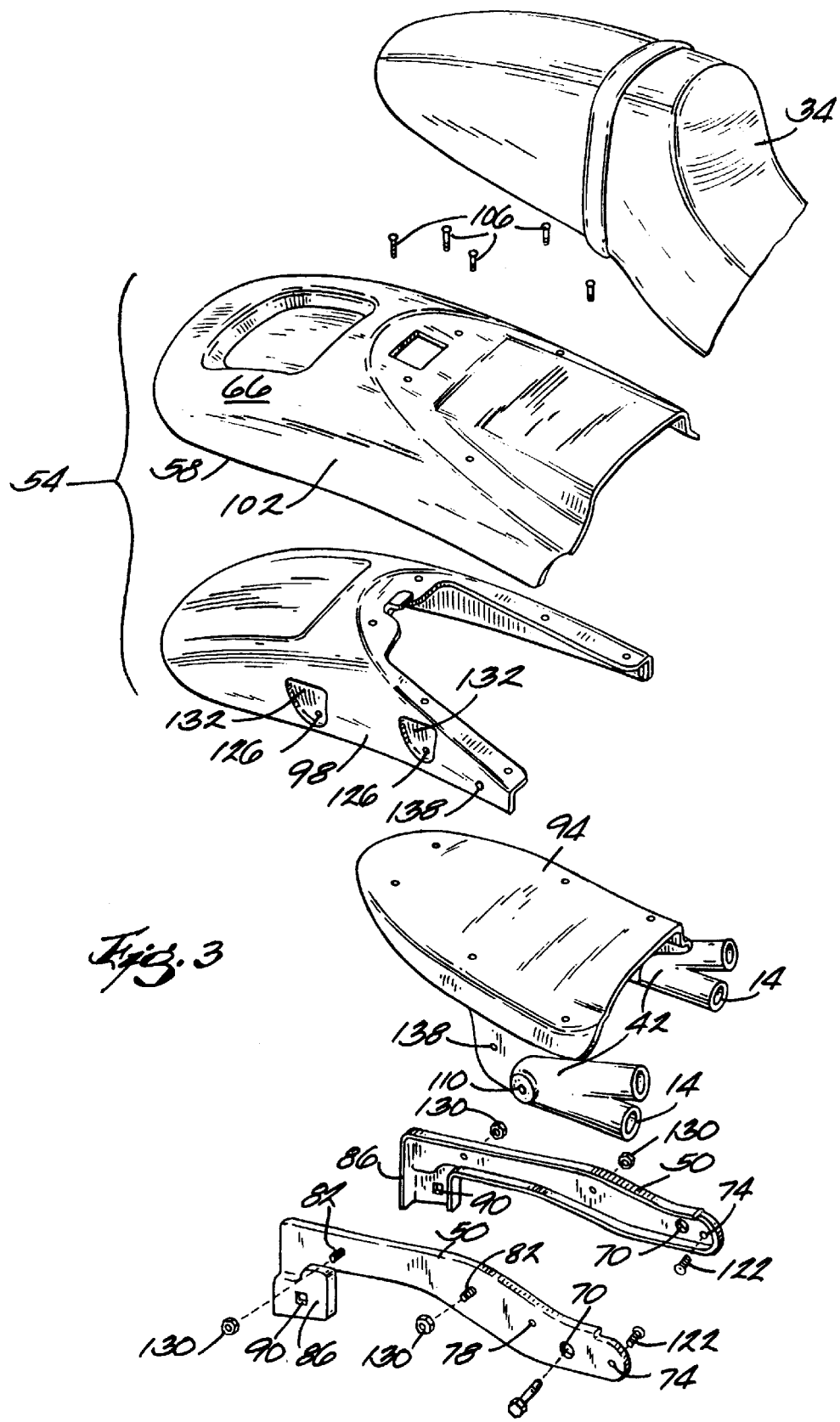
FIG. 3 is an exploded view of the rear portion of the motorcycle.

Referring to FIGS. 3 and 4, the internal supports 50 each include a shock bolt hole 70, a mounting hole 74, a threaded hole 78 (e.g., a nut welded to the internal support 50 or a threaded insert), a pair of threaded studs 82, and a depending portion 86 defining a slot and having a square aperture 90. The frame 14 includes a seat pan 94 that is welded or otherwise affixed to the shock mounting portion 42 of the frame 14. The seat pan 94 is a heavy-duty stamped metal piece. The rear fender 54 includes an inner fender 98 and an outer fender 102. The inner fender 98 is preferably a heavy-duty stamped aluminum piece, but may be constructed of any suitable material. The inner fender 98 acts as an extension of the seat pan 94. The inner fender 98 defines the inner surface 62 of the rear fender 54. The outer fender 102 is a more decorative piece and provides an aesthetically pleasing appearance for the rear fender 54. The inner and outer fenders 98, 102 are mounted to the seat pan 94 with suitable fasteners 106, and the fasteners 106 are covered by the seat 34.

Referring to FIGS. 3–5, the shock mounting portion 42 of the frame 14 includes a through-hole 110 and a threaded blind bore 114 extending through its inner surface. A shock bolt 118 extends through the through-hole 110, and through the shock bolt hole 70 in the internal support 50. A threaded fastener 122 extends through the mounting hole 74 in the internal support 50 and is threaded into the threaded blind bore 114.

Figure 8:
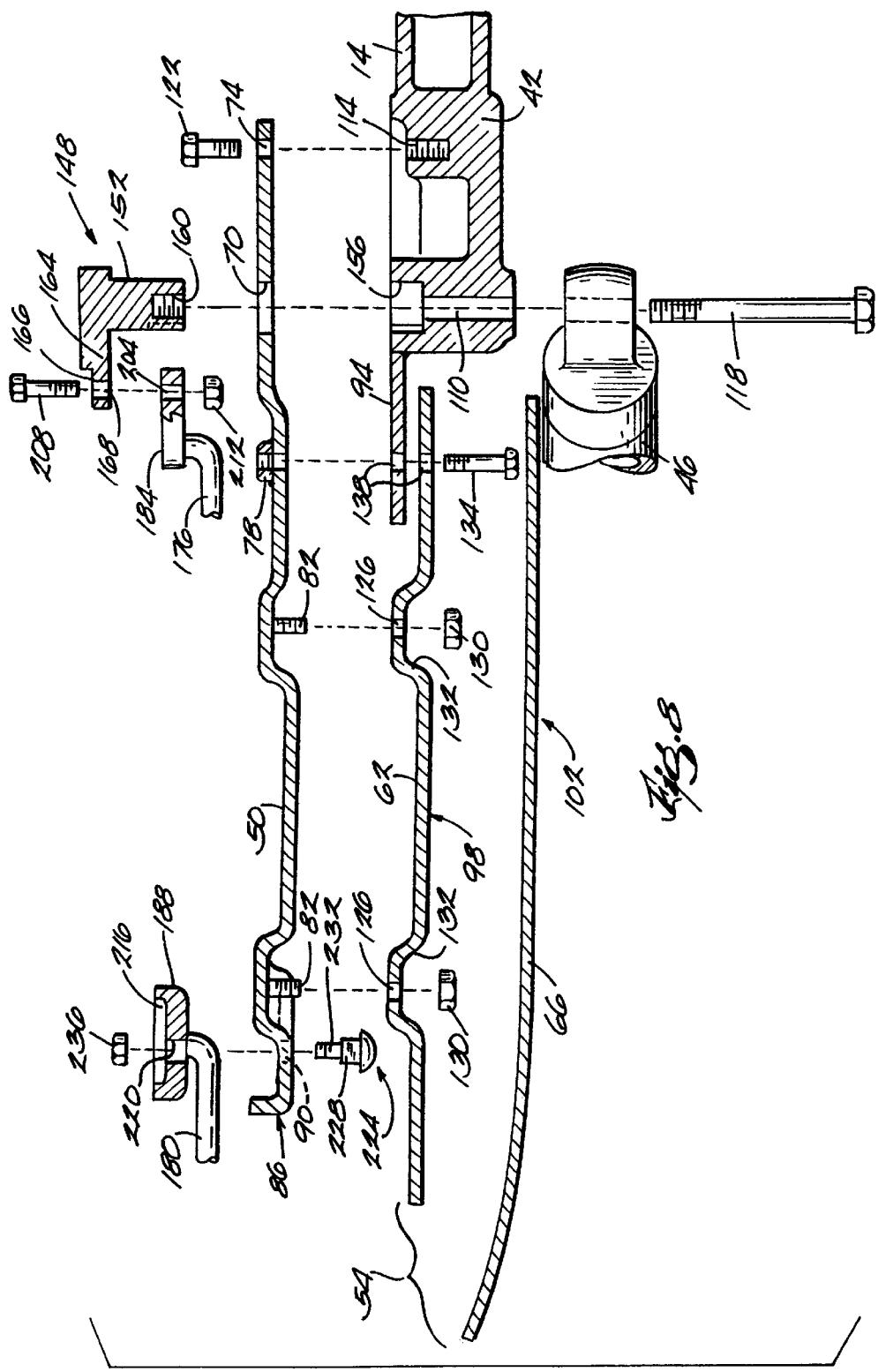
FIG. 8 is an exploded section view taken along line 8—8 of FIG. 6.

As seen in FIGS. 3, 6, and 8, the threaded studs 82 extend through holes 126 in the side of the inner fender 98. Nuts 130 are threaded onto the threaded studs 82 to sandwich the inner fender 98 between the nuts 130 and the internal support 50. The inner fender 98 includes nut pockets 132 that receive the nuts 130. A threaded fastener 134 extends through holes 138 in the inner fender 98 and seat pan 94, and is threaded into the threaded hole 78 in the internal support 50. The nuts 130 on the studs 82, and the head of the fastener 134 are between the outer fender 102 and the inner fender 98 once the outer fender 102 is attached to the rear portion of the motorcycle 10.

Referring back to FIG. 2, the motorcycle 10 also includes a turn signal module 140 that wraps around the rear portion of the rear fender 54. The depending portion 86 of the internal support 50 extends below the lower edge 58 of the rear fender 54. The turn signal module 140 depends from the lower edge 58 of the rear fender 54, and includes a side reflector 144 that covers the depending portion 86 of the internal support 50. The internal support 50 is therefore not visible during ordinary operation of the motorcycle 10 because it is obscured by the rear fender 54 and the side reflector 144.

Referring now to FIGS. 4, 6, 8, and 9, a mounting member 148 includes an elongated collar portion 152 that extends through the shock bolt hole 70 in the internal support 50, and into a counter bore 156 in the shock mounting portion 42. The shock bolt 118 threads into a threaded bore 160 in the collar portion 152. The mounting member 148 also includes a flat extension arm 164 extending adjacent the inner surface 62 of the inner fender 98. The extension arm 164 extends below the lower edge 58 of the rear fender 54, and includes a pocket 166 and a mounting hole 168 in the pocket 166 and below the lower edge 58.

Figure 10:
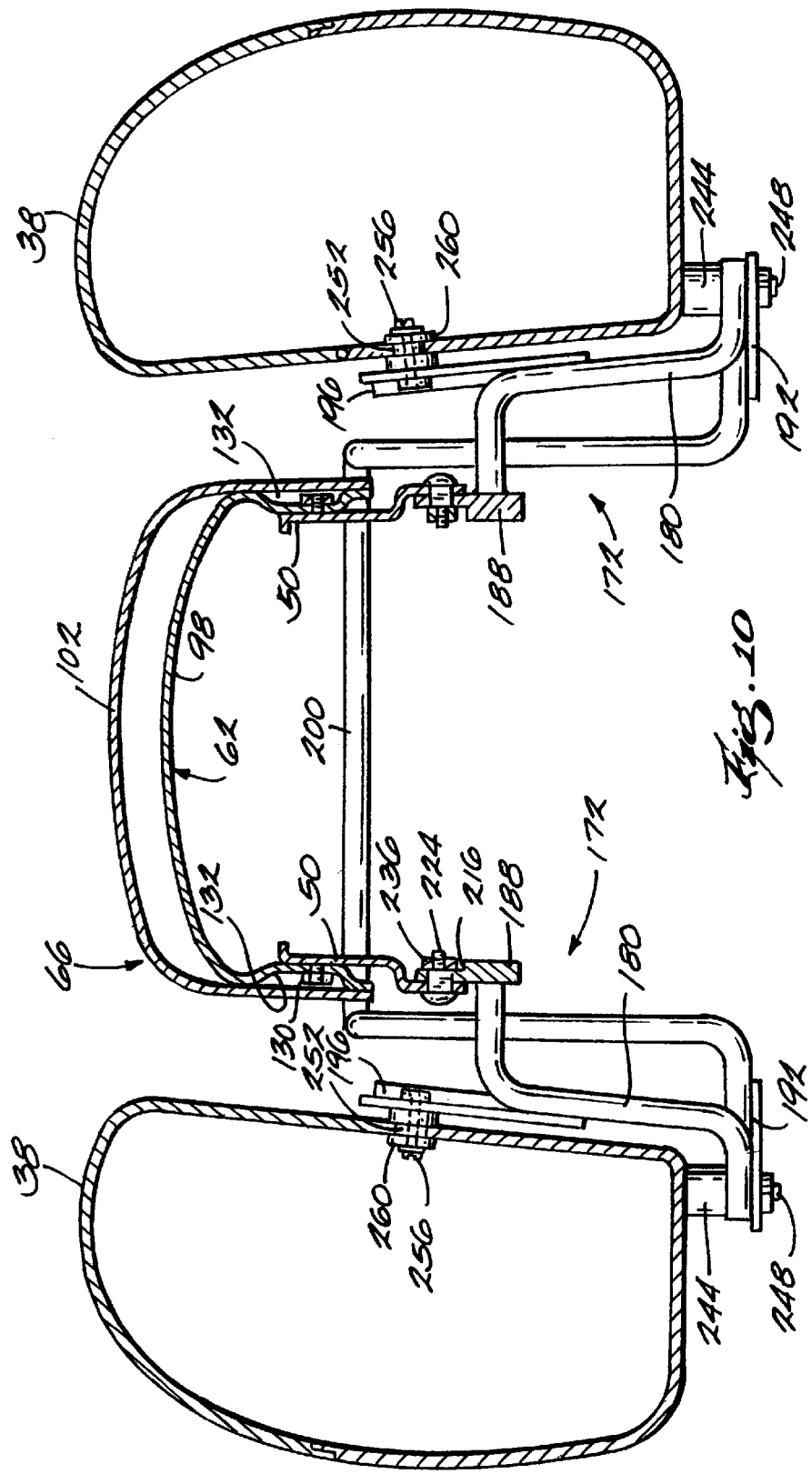
FIG. 10 is a section view taken along line 10—10 in FIG. 1.

FIGS. 4 and 10 illustrate left and right saddlebag support assemblies 172. The left and right saddlebag support assemblies are substantially mirror images of each other, and therefore only one saddlebag support assembly is described below.

The saddlebag support assembly 172 includes front and rear arms 176, 180 supporting respective front and rear mounting plates 184, 188. The saddlebag support assembly 172 also includes a bottom support 192 extending between the lower extremities of the front and rear arms 176, 180, and a bracket 196 extending between middle portions of the front and rear arms 176, 180. A rear cross-support 200 extends between the bottom supports 192 of the left and right assemblies 172, and around the rear end of the rear fender 54, thereby providing further stability to both assemblies 172.

The bottom support 192 and the bracket 196 are preferably welded to the front and rear arms 176, 180, but may alternatively be integrally formed with one or both of the front and rear arms 176, 180, as by casting or another suitable method. The rear cross-support 200 is preferably welded to the bottom supports 192, but may alternatively be integrally formed with the bottom supports 192. The front and rear mounting plates 184, 188 are also preferably welded to the upper extremities of the front and rear arms 176, 180, respectively, but may alternatively be integrally formed therewith.

Referring to FIGS. 4, 6, and 8, the front mounting plate 184 includes a hole 204 that is aligned with the mounting hole 168 in the arm 164 of the mounting member 148. A front fastener 208 and nut 212 are used to join the mounting arm 164 and the front mounting plate 184 of the saddlebag support assembly 172. The front fastener 208 is easily accessible because it is below the lower edge 58 of the rear fender 54. The head of the front fastener 208 is contained within the pocket 166 in the extension arm 164.

As seen in FIGS. 4, 6, 8, and 10, the rear mounting plate 188 is generally square in shape, and includes a recessed nut pocket 216 and a square hole 220.

The rear mounting plate 188 fits within the slot in the depending portion 86 of the internal support 50, and the square holes 220, 90 of the rear mounting plate 188 and depending portion 50 are aligned. A carriage bolt 224 has a square shank 228 that snugly fits in the square holes 220, 90, and is not rotatable within the square holes 220, 90. The carriage bolt 224 also includes a threaded end 232 onto which a nut 236 is threaded to secure the rear mounting plate 188 to the depending portion 86 of the internal support 50. The nut 236 is received in the nut pocket 216 to provide a low profile to the mounting structure and provide as much clearance as possible for the rear wheel 30 within the rear fender 54.

Referring to FIGS. 4–6 and 10, the bracket 196 includes a pair of threaded inserts 240. Bumpers or cushions 244 are mounted to the bottom support 192 with fasteners 248. The saddlebag 38 is mounted to the support assembly 172 by resting the bottom of the saddlebag 38 on the bumpers 244 and aligning holes 252 in the side of the saddlebag 38 with the threaded inserts 240. Screws 256 are extended through the holes 252 and into the threaded inserts 240. Grommets 260 are inserted into the holes 252 in the saddlebag 38 to ensure a substantially weather-tight fit.

The saddlebag support assembly 172 may be removed from the motorcycle 10 by unthreading the nuts 212, 236 from the front fastener 208 and the carriage bolt 224. It should be noted that access to both the front fastener 208 and the carriage bolt 224 is facilitated by the fasteners 208, 224 being below the lower edge 58 of the rear fender 54. Because the front mounting plate 184 is mounted to the end of the mounting member arm 164, rather than directly to the shock bolt 118, the saddlebag support assembly 172 may be removed from the motorcycle 10 without removing the shock bolt 118.

The mounting member 148 may be left on the motorcycle 10, even when the saddlebag support assembly 172 is not mounted thereto. Only the end of the extension arm 164 is visible below the lower edge 58 of the rear fender 54. The collar 152 is provided with flats 264 (see FIG. 9) to engage flats in the counter bore 156 in the shock mounting portion 42 of the frame 14. The flats 264 may be aligned to position the mounting member 148 in the operating position (illustrated in solid lines in FIG. 6), or in a stowed or retracted position (illustrated in phantom in FIG. 6). When in the stowed position, the mounting member 148 is pivoted up within the confines of the rear fender 54, and out of view. As used herein, the phrase "within the confines of the rear fender" means above the lower edge 58 and between the inner surfaces 62 of the sides of the rear fender 54.

To move the mounting member 148 between the operating and stowed positions, the shock bolt 118 must be loosened and then re-tightened after the mounting member 148 has been repositioned. Therefore, if one wishes to maintain the aesthetics of the lower edge 58 of the rear fender 54 with the saddlebags 38 removed, one has only to remove the saddlebag support assemblies 172, loosen the shock bolt 118, pivot the mounting member 148 to the stowed position (such that the appropriate flat 264 registers with the flat in the counter bore 156), and re-tighten the shock bolt 118. Additionally, the flats 264 serve to resist rotation of the mounting member 148 as the shock bolt 118 is tightened. The extension arm 164 may also be positioned in the operating and stowed position without the use of the flats 264, as the tightness of the shock bolt 118 substantially prevents any pivoting of the mounting member 148 with respect to the shock mounting portion 42 of the frame 14.

What is claimed is:

1. A motorcycle comprising:
   a frame having a shock mounting portion;
   a rear wheel rotatably interconnected to said frame to support a rear portion of said motorcycle;
   a shock having first and second opposite ends;
   a shock bolt mounting said first end of said shock to said shock mounting portion of said frame, said second end of said shock being interconnected with said rear wheel;
   a rear fender positioned over a portion of said rear wheel, said rear fender including an inner surface facing said rear wheel and an outer surface facing away from said rear wheel, said rear fender including a lower edge;
   a mounting member directly mounted to said shock bolt, said mounting member extending adjacent said inner surface of said rear fender, and having a lower end extending below said lower edge of said rear fender;
   a saddlebag support assembly;
   a fastener releasably mounting a first portion of said saddlebag support assembly to said lower end of said mounting member; and
   a saddlebag mounted to said saddlebag support assembly adjacent said outer surface of said rear fender.

2. The motorcycle of claim 1, further comprising an internal fender support directly mounted to said shock bolt and extending rearwardly of said frame along said inner surface of said rear fender, said rear fender being directly mounted to said internal fender support, wherein said saddlebag support assembly includes a second portion directly mounted to said internal fender support.

3. The motorcycle of claim 2, wherein said internal fender support includes a depending portion extending downwardly below said lower edge of said rear fender, and wherein said second portion of said saddlebag support assembly is directly mounted to said depending portion of said internal fender support.

4. The motorcycle of claim 3, further comprising a turn signal module mounted to a rear end of said rear fender, said turn signal module extending along said lower edge of said rear fender and covering said depending portion of said internal fender support.

5. The motorcycle of claim 3, wherein said depending portion of said internal fender support defines a slot, and wherein said second portion of said saddlebag support assembly includes a plate received within said slot, said motorcycle further comprising a bolt extending through said depending portion of said internal fender support and through said plate.

6. The motorcycle of claim 2, wherein said mounting member has an elongated collar portion extending through a portion of said internal fender support and defining a threaded bore, said shock bolt being threadably received within said threaded bore.

7. The motorcycle of claim 6, wherein said collar includes first and second flats, said first flat engaging a portion of said internal fender support when said mounting member extends below said lower edge of said rear fender, wherein said mounting member is movable to a retracted position in which said second flat engages said portion of said internal fender support, said end of said mounting member being above said lower edge of said rear fender when said mounting member is in said retracted position such that said mounting member is hidden during ordinary operation of said motorcycle.

8. The motorcycle of claim 1, further comprising:
   a motorcycle seat;
   wherein said frame includes a seat pan, said motorcycle seat being mounted to said seat pan;
   wherein said rear fender includes an inner fender and an outer fender, said inner fender being fastened to said seat pan and including said inner surface, said outer fender being mounted to said inner fender with outer fender fasteners, all of said outer fender fasteners being positioned under said seat and hidden from view during normal operation of said motorcycle.

9. The motorcycle of claim 8, further comprising an internal fender support directly mounted to and extending rearwardly of said frame along said inner surface of said rear fender, said internal fender support including a threaded stud extending through said inner fender, said motorcycle further comprising a nut between said inner fender and said outer fender and threaded onto said threaded stud to sandwich said inner fender between said nut and said internal fender support and thereby secure said inner fender to said internal fender support, said nut being hidden from view by said outer fender during normal operation of said motorcycle.

10. The motorcycle of claim 8, further comprising an internal fender support directly mounted to and extending rearwardly of said frame along said inner surface of said rear fender, said internal fender support including a threaded bore, wherein said seat pan and said inner fender include through-holes in alignment with said threaded bore, said motorcycle further comprising a bolt having a bolt head, a portion of said bolt extending through said holes in said inner fender and said seat pan, and being threaded into said threaded bore in said internal fender support, said bolt head being positioned between said inner fender and said outer fender and being hidden from view by said outer fender during normal operation of said motorcycle.

11. The motorcycle of claim 1, wherein said saddlebag support assembly includes at least one engageable bore, said saddlebag including a hole registering with said bore, said motorcycle further comprising a grommet positioned within said hole, and a saddlebag mounting fastener extending through said grommet and engaging said bore securing said saddlebag to said saddlebag support assembly.

12. The motorcycle of claim 1, wherein said saddlebag support assembly further includes at least one resilient bumper positioned under said saddlebag, said saddlebag resting on said bumper during operation of said motorcycle.

13. A method of mounting a saddlebag support assembly on a motorcycle including a frame having a shock mounting portion, a rear wheel rotatably interconnected to the frame to support a rear portion of the motorcycle, a shock having opposing first and second ends, a shock bolt mounting the first end of the shock to the shock mounting portion of the frame, the second end of the shock being interconnected with the rear wheel, and a rear fender positioned over a portion of the rear wheel, the rear fender including an inner surface facing the rear wheel and an outer surface facing away from the rear wheel, the rear fender including a lower edge, the method comprising:

provviding a mounting member directly mounted to the shock bolt, the mounting member extending adjacent the inner surface of the rear fender annd having an end positioned above the lower edge of the rear fender;

pivoting the mounting member to position the end below the lower edge of the rear fender; and mounting a first portion of the saddlebag support assembly to the end of the mounting member.

14. The method of claim 13, further comprising mounting a saddlebag to the saddlebag support assembly adjacent the outer surface of the rear fender.

15. The method of claim 14, wherein mounting a saddlebag to the saddlebag support assembly includes resting the saddlebag on at least one resilient bumper on the saddlebag support assembly.

16. The method of claim 14, wherein mounting a saddlebag to the saddlebag support assembly includes registering a hole of the saddlebag with a bore of the saddlebag support assembly, extending a saddlebag mounting fastener through a grommet positioned within the hole, and engaging the bore with the saddlebag mounting fastener to secure the saddlebag to the saddlebag support assembly.

17. The method of claim 13, wherein the motorcycle includes an internal fender support directly mounted to the shock bolt and extending rearwardly of the frame along the inner surface of the rear fender, the rear fender being directly mounted to the internal fender support, the method further comprising mounting a second portion of the saddlebag support assembly to the internal fender support.

18. The method of claim 17, wherein the internal fender support includes a depending portion extending downwardly below the lower edge of the rear fender, and wherein mounting a second portion of the saddlebag support assembly includes mounting the second portion of the saddlebag support assembly to the depending portion of the internal fender support.

19. The method of claim 18, wherein the motorcycle includes a turn signal module mounted to a rear end of the rear fender, the turn signal module extending along the lower edge of the rear fender, the method further comprising covering the depending portion of the internal fender support with the turn signal module.

20. The method of claim 18, wherein the depending portion of the internal fender support defines a slot, and wherein mounting a second portion of the saddlebag support assembly includes positioning a plate of the second portion of the saddlebag support assembly within the slot, and extending a bolt through the depending portion of the internal fender support and through the plate.

21. The method of claim 17, wherein providing a mounting member includes providing a mounting member having an elongated collar portion extended through a portion of the of the internal fender support, wherein the shock bolt is received within a threaded bore.

22. The method of claim 21, wherein providing a mounting member includes providing a mounting member with a collar including first and second flats, wherein the first flat engages the portion of the internal fender support when the end of the mounting member is above the lower edge of the rear fender such that the mounting member is hidden during ordinary operation of the motorcycle.

23. The method of claim 22, further comprising engaging the second flat with the portion of the internal fender support when the end of the mounting member extends below the lower edge of the rear fender.

\* \* \* \* \*